Aug. 29, 1944.  C. L. ZITZA  2,356,906

FUEL CELL VENT SYSTEM

Filed Jan. 25, 1944  2 Sheets-Sheet 1

INVENTOR.
CURT L. ZITZA
BY George Douglas Jones,
ATTORNEY

Aug. 29, 1944.　　　　C. L. ZITZA　　　　2,356,906
FUEL CELL VENT SYSTEM
Filed Jan. 25, 1944　　　　2 Sheets-Sheet 2
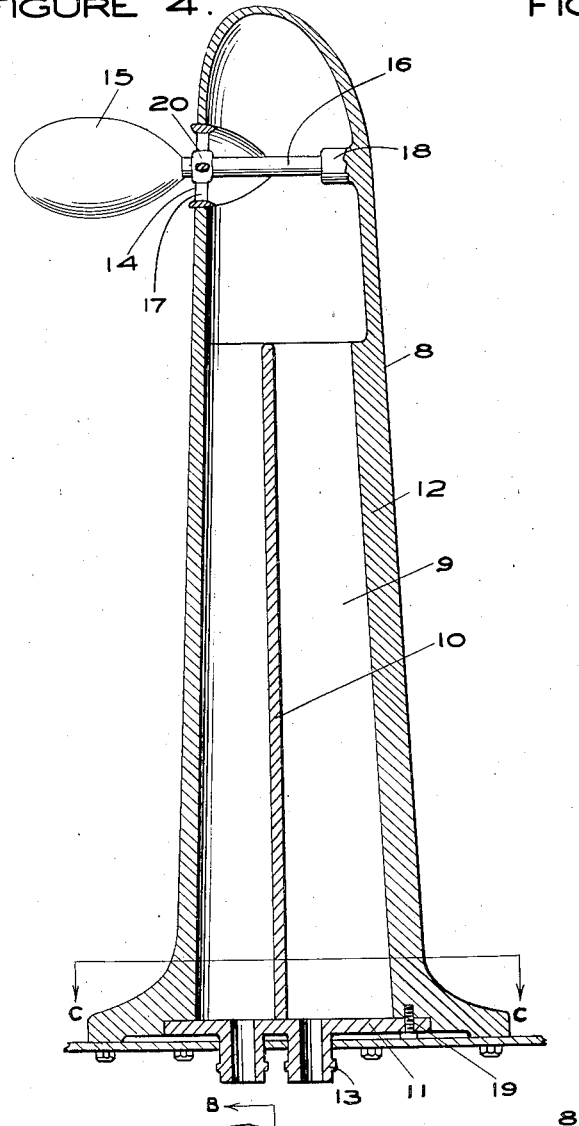
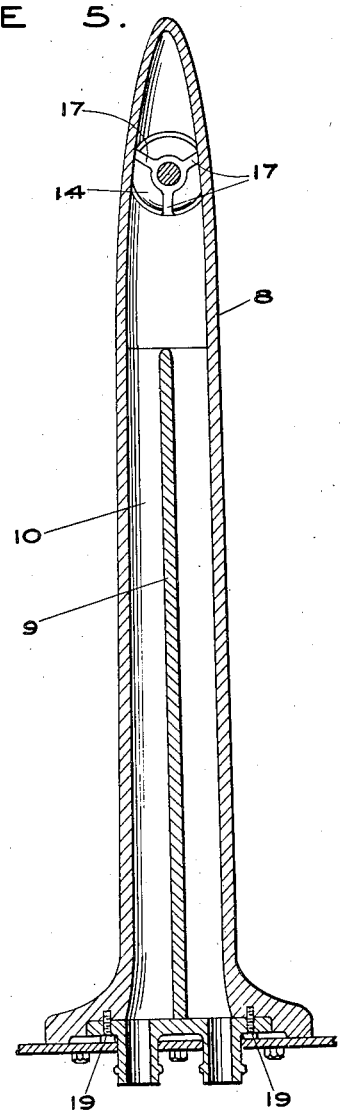
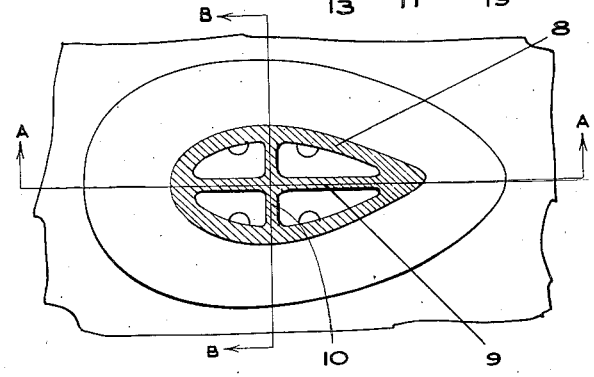
INVENTOR.
CURT L. ZITZA
BY
George Douglas Jones
ATTORNEY Patented Aug. 29, 1944

2,356,906

UNITED STATES PATENT OFFICE 2,356,906

FUEL CELL VENT SYSTEM

Curt L. Zitza, Baltimore, Md., assignor to The Glenn L. Martin Company, Middle River, Md., a corporation of Maryland Application January 25, 1944, Serial No. 519,607

12 Claims. (Cl. 244—135)

This invention relates to the venting of the fuel tanks of the fuel system of an airplane.

It is now almost universal practice to utilize the space between the front and rear spars in the wing panels of an aircraft for the storage of fuel. The fuel is stored in containers of rubberlike, flexible wall structure. These containers are placed in cavities formed in the wing between the front and rear spars. Due to the flexible nature of the wall structure of the fuel containers, it is necessary that the tanks not only be vented but maintained under a slight positive pressure to prevent the partial collapse of these flexible cells. Vent lines are, therefore, required to vent the cells, and also to provide this pressure from the slip stream of the airplane.

By this invention, a vent system is provided that can be used with one or more cells for the purpose of venting the cells and providing the positive pressure required to maintain the cells against partial collapse.

Another object of the invention is the proper central location of a common vent for the lines leading from the cells.

A further object of this invention is the provision of anti-icing structure on the vent.

A further object of this invention is the provision of an adjustable device to control the pressure desired in the fuel cells.

Further and other objects will become apparent from the description of the accompanying drawings which form a part of this disclosure and in which like numerals refer to like parts.

In the drawings:

Figure 4 is an enlarged longitudinal section through the vent mast taken on the line A—A of Figure 6.

Figure 5 is a section through the vent mast taken on the line B—B of Figure 6.

Figure 6 is a fragmentary plan view, partially in section taken on the line C—C of Figure 4.

Figure 1:
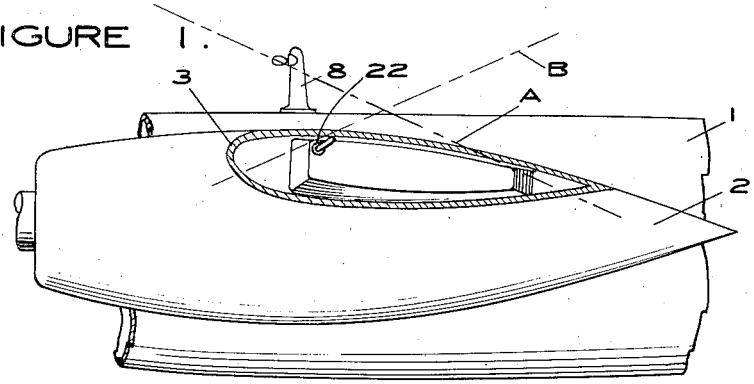
Figure 1 is a fragmentary view of an airplane partially in section, showing the invention.
Figure 2:
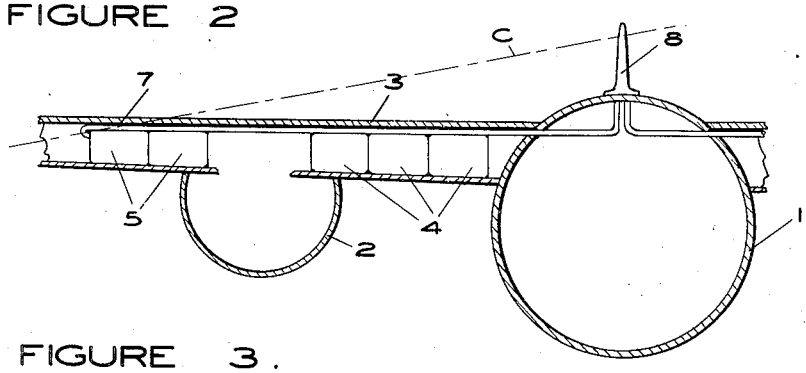
Figure 2 is a fragmentary sectional view through the fuselage, wing and engine nacelle of an airplane.
Figure 3:
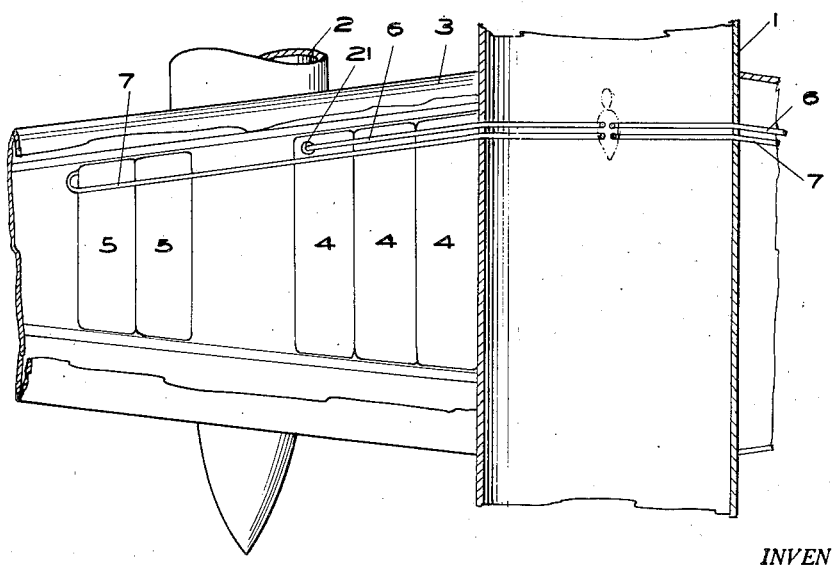
Figure 3 is a fragmentary plan view, partially in section, showing the installation of this invention.

Figure 1 of the drawings shows a fuselage 1, an engine nacelle 2, supported by a wing 3. A group of three fuel storage cells 4 are shown in Figures 2 and 3, in the wing between the engine nacelle and the fuselage of the airplane. Another group of cells 5 are shown outboard of the nacelle in the wing. This is a typical arrangement employed in a two-engine aircraft. It should be understood that the number of cells or the number of groups of cells arranged along the wing of the aircraft between the spars is optional.

The group of cells 4—4—4 are interconnected with suitable fittings so that as fuel is pumped from the group, it flows between the cells to equalize the fluid therein. A vent line 6 for this group of cells is secured to the outboard end of the cell adjacent the top at fitting 21. A similar vent line 7 is shown for the group 5—5, attached to fitting 22. A vent mast 8 is shown centrally located preferably on the fuselage to which the vent lines 6 and 7 are connected.

This vent mast 8 may be of metal or plastic material as shown in Figures 4 to 6. This mast is hollow and comprises a housing 12 and has partitions 9 and 10 dividing a substantial portion of the lower portion of the mast into four compartments. Plate 11 is secured in a recess in the bottom of the mast housing by screws 19. This plate has four tubular members 13 to which the four vent lines illustrated in Figure 3 are connected. Partitions 9 and 10 terminate within the mast at a point substantially below vent opening 14. This permits the hollow mast to act as an overflow chamber from which any gasoline spilling through the vents during maneuvering of the airplane can be caught and drained back into the tanks to which the vent lines are connected. The opening 14 adjacent the top of the mast has a streamlined body 15 mounted in front of the opening support by shaft 16 which in turn is supported by webs 17 and boss 18. It will be noted that the diameter of body 15 is larger than the diameter of opening 14. Member 15 can be moved relative to opening 14 by shaft 16 sliding in supports 17 and 18. Shaft 16 is secured in the desired final position by set screw 20.

The height and fore and aft location of the mast is determined by the liquid level in the tanks for the maximum dive, climb and sideslip attitudes of the airplane. For purposes of illustration, line A of Figure 1, will represent the maximum liquid level in the wing tanks for a dive attitude. Since the vent mast opening is above this line, no fuel will be spilled in diving. Line B, represents a climb attitude, and since the opening is well above this line, no fuel will be spilled on climb. Line C indicates the maximum angle of sideslip. In other words, the mast will be so located and of such a height that the opening will be positioned above the liquid level in the wing tanks for all attitudes of the airplane. The fore and aft location of the vent mast should be such that, the vent lines extending from their connections on the tanks to the base of the mast should be substantially lateral of the base of the mast to prevent spilling of fuel during acceleration and deceleration of the airplane.

The vent lines from the base of the mast must extend over or near the tops of the tanks to the outboard ends of the tanks and terminate above the liquid level.

Streamlined body 15 is of such a diameter relative to the opening 14 that it acts as an anti-icing member in that particles of ice or water will impinge upon the forward end of member 15 and be deflected so that they hit the mast above or below opening 14 or pass around the sides thereof but will not enter opening 14. The air, freed of such particles of solid or liquid, will pass around member 15 in the well-known manner of fluid flow around an aerodynamic body, and enter opening 14. The amount of air entering opening 14 or the pressure of the air in the mast can be regulated by adjusting the position of member 15 relative to the opening 14.

From the above description of the vent system of the airplane, it will be seen that vent lines 6 and 7 interconnecting tanks 4 and 5 and hollow vent mast 8 afford a vent, in the normal sense of the word, for the tanks while the tanks are being filled. This same system, combined with features of the forwardly directed opening in the mast, afford a means for maintaining a predetermined positive pressure in the cells which may be varied from time to time to meet changed conditions.

The location of the ends of the vent line at the outboard upper end of the tank or group of tanks is important for the following reasons: If the vent lines were connected to the inboard end of a tank or group of tanks, upon bank or sideslip the fuel would drain from the tank into the vent line as long as the plane was in this position. With the vent line connected to the outboard end of the tank, upon bank fuel will flow into the vent line of the tanks on the lower side of the airplane only to the level of the fuel in the tank and upon righting the ship to even keel, the fuel in the vent line will flow back to the tank by gravity or under the influence of pressure from the vent opening.

If the airplane should bank, it will be noted that fuel in the tanks on the low side of the airplane, will flow into vent lines 6 and 7. If the airplane suddenly banks in the opposite direction, the fuel will flow the full length of the vent lines and will reach the hollow mast 8. Before it spills overboard through opening 14, it will flow over partitions 9 and 10 and through the vent lines on the other side of the fuselage to the tanks located in the opposite wing. When the plane is righted to even keel, the gasoline will flow from the vent mast through the vent lines back to the tanks on either side of the fuselage. Gravity should be sufficient to cause this return flow due to the location of the vent lines above the tanks but gravity is aided by the pressure created by the forwardly direct opening in mast 8.

It is to be understood that certain changes, alterations, modifications and substitutions can be made without departing from the spirit and scope of the appended claims.

I claim as my invention:

1. In combination in an airplane having wings and a fuselage, a tank for the storage of fuel located in the wing panels on each side of said fuselage, a centrally located vent for such tanks secured to said fuselage and vent lines interconnecting said vent and vent line fittings located at the outboard, upper end of said tanks.

2. In combination in an airplane having wings and a fuselage, tanks for the storage of fuel located in the wing panels on each side of said fuselage, a centrally located vent for such tanks secured to said fuselage and vent lines interconnecting said vent and the outboard upper end of said tanks.

3. In combination in an airplane having wings and a fuselage, groups of interconnected fuel storage tanks located in the wing panels of each side of said fuselage, a centrally located vent for such tanks secured to said fuselage and vent lines interconnecting said vent and the outboard upper end of said tanks.

4. In combination in an airplane having wings and a fuselage, tanks for the storage of fuel located in the wing panels on each side of the fuselage, a centrally located vent mast secured to said fuselage, and vent lines interconnecting said vent mast and the outboard upper ends of said tanks.

5. In combination in an airplane having wings and a fuselage, tanks for the storage of fuel located in the wing panels on each side of said fuselage, a centrally located hollow vent mast secured to said fuselage having a vent opening adjacent its outer end communicating with the hollow space in the mast, vent lines interconnecting said hollow space in said vent mast and the outboard upper ends of said tanks.

6. In combination in an airplane having wings and a fuselage, tanks for the storage of fuel located in the wing panels on each side of said fuselage, a centrally located hollow vent mast secured to said fuselage having a vent opening adjacent its outer end communicating with the hollow space in the mast, vent lines interconnecting said hollow space in said vent mast and the outboard upper ends of said tanks.

7. In combination an airplane having wings and a fuselage, tanks for the storage of fuel located in the wing panels on each side of said fuselage, a centrally located hollow vent mast secured to said fuselage having a vent opening adjacent its outer end communicating with the hollow space in the mast, vent lines interconnecting said hollow space in said vent mast and the outboard upper ends of said tanks.

8. In combination an airplane having wings and a fuselage, tanks for the storage of fuel located in the wing panels on each side of said fuselage, a centrally located hollow vent mast secured to said fuselage having a vent opening adjacent its outer end communicating with the hollow space in the mast, longitudinally extending partitions in said mast, terminating below said vent opening, forming a plurality of longitudinally extending compartments in the lower portion of said mast, vent lines interconnecting each of said compartments with the outboard, upper end of a tank.

9. In combination an airplane having wings and a fuselage, tanks for the storage of fuel located in the wing panels on each side of said fuselage, a centrally located hollow vent mast secured to said fuselage having a vent opening adjacent its outer end communicating with the hollow space in the mast, an aerodynamic body positioned in front of said opening to direct air toward the opening but deflect particles away from said opening, vent lines interconnecting said hollow space in said vent mast and the outboard upper ends of said tanks.

10. In combination an airplane having wings and a fuselage, tanks for the storage of fuel located in the wing panels on each side of said fuselage, a centrally located hollow vent mast secured to said fuselage having a vent opening adjacent its outer end communicating with the hollow space in the mast, an aerodynamic body positioned in front of said opening to direct air toward the opening but deflect particles away from said opening, the spacing of said body being adjustable with respect to said opening to regulate the amount of air and thereby the pressure in the system, vent lines interconnecting said hollow space in said vent mast and the outboard upper ends of said tanks.

11. In an airplane having wings and a fuselage, tanks for the storage of fuel located in the wing panels on each side of said fuselage, a centrally located vent mast secured to said fuselage, and vent lines interconnecting said vent mast and the outboard upper ends of said tanks, said vent mast being located substantially in line with the ends of said vent lines at said tanks, so that said vent lines extend substantially laterally of said mast.

12. In combination in an airplane having wings and a fuselage, tanks for the storage of fuel located in the wing panels on each side of said fuselage, a centrally located hollow vent mast secured to said fuselage having a vent opening adjacent its upper end communicating with the hollow space in the mast, vent lines interconnecting said hollow space in said vent mast and the outboard upper ends of said tanks, said vent opening being so located on said mast that said opening is above the liquid level in said tanks for maximum dive, climb and sideslip angles.

CURT L. ZITZA.